March 15, 1966  E. M. McNATT  3,241,101
DELINEATION OF SEISMIC REFLECTING HORIZONS
Original Filed Dec. 3, 1951  6 Sheets-Sheet 1

Eugene M. McNatt  Inventor
By James A. Reilly  Attorney

Eugene M. McNatt    Inventor

By James A. Reilly    Attorney

Eugene M. McNatt
INVENTOR

March 15, 1966  E. M. McNATT  3,241,101
DELINEATION OF SEISMIC REFLECTING HORIZONS
Original Filed Dec. 3, 1951  6 Sheets-Sheet 4

Eugene M. McNatt  Inventor
By James A. Reilly  Attorney

March 15, 1966     E. M. McNATT     3,241,101
DELINEATION OF SEISMIC REFLECTING HORIZONS
Original Filed Dec. 3, 1951     6 Sheets-Sheet 5

Eugene M. McNatt     Inventor

By *James A. Reilly*     Attorney

March 15, 1966   E. M. McNATT   3,241,101
DELINEATION OF SEISMIC REFLECTING HORIZONS
Original Filed Dec. 3, 1951   6 Sheets-Sheet 6

Eugene M. McNatt   Inventor
By James A. Reilly   Attorney

United States Patent Office 3,241,101
Patented Mar. 15, 1966

3,241,101
DELINEATION OF SEISMIC REFLECTING
HORIZONS
Eugene M. McNatt, Bronxville, N.Y., assignor, by mesne
assignments, to Esso Production Research Company,
Houston, Tex., a corporation of Delaware
Continuation of application Ser. No. 259,681, Dec. 3,
1951. This application Apr. 6, 1959, Ser. No. 804,401
10 Claims. (Cl. 340—15.5)

The present invention relates to an improved method for delineating subsurface horizons by seismic prospecting techniques. More particularly the invention concerns a method for presenting seismic information in the form of traces each of which has a uniform width throughout its length, such as a variable density trace, for an entire seismic profile, whereby subsurface reflections not clearly seen on conventional seismic records can readily be distinguished.

This application is a continuation of application Serial No. 259,681, filed Dec. 3, 1951, now abandoned, in the name of the same inventor.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors known as geophones, which translate the detected motion into electric impulses which are suitably amplified and recorded on a seismograph. The conventional seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. These traces are essentially rectangular coordinate graphs of geophone velocity (or displacement, or acceleration, depending on the type of geophone used) versus time. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

Oscillograph records of detected seismic waves obtained as just described when made in favorable areas may often be examined visually to pick out prominent reflections which will show up as similar transients on the adjacent traces on the record. However, in many instances such reflections are difficult to pick out because of the complexity of the wave forms. It has more recently been noted that if the detected impulses are recorded in the form of variable density records many more reflections can often be distinguished. Suitable means for making such variable density records are described, for example, in U.S. Patent 2,051,153 of Frank Rieber. Rieber in his patent refers to such records as being "phonographic" in that they may be used in a reproducer to produce electrical impulses which can be analyzed as to their component parts and again recorded in terms of the complete whole or the separate parts.

It is an object of the present invention to provide an improved seismic section and a method for preparing the same employing the variable density technique or related techniques of seismic recording wherein an increased quantity and quality of geologic information can be obtained.

In accordance with this invention a seismic profile is run in the more or less conventional manner whereby seismic disturbances are initiated successively at a plurality of points arranged adjacent the earth's surface in a selected profile pattern and the resulting reflected seismic waves from each disturbance are detected at a plurality of points spaced from the initiating point of the seismic disturbance. The detected waves are converted into electrical impulses and recorded in the form of records of any type comprising essentially straight line traces that are characterized by having essentially the same width throughout their length and varying in a phonographic property in relation to the signal recorded. Thus for example variable density records may be used, as mentioned above, or alternatively variable color records may be used. The impulses from the several detection points for each seismic disturbance are recorded simultaneously side by side in arrival time relationship. Corrections are then computed for each trace to convert the arrival time of the recorded impulses to a common datum and then each individual trace is reproduced by transferring it onto a second record medium while shifting the record lengthwise to incorporate the computed time corrections. Conveniently, the transfer is effected by photographic projection. One of the corrections that is made is that for spread, and that is done most conveniently by selecting a desired reflection depth and shifting each trace to correct the time for that depth. Alternatively, means may be employed to make a continuous spread correction along the trace. The projected traces are placed side by side in corrected time relation for each station and the width of each projected trace is proportioned to the reflection point spacing while at the same time essentially preserving the relative distances between time markings on the several traces. Usually, with even geophone spacing this will be equivalent to the proportional spacing between shot points. The result is a general photographic representation of the various reflections with the possible exception that when steeply dipping beds are encountered it may be necessary, for geometric reasons, for the person interpreting the record to "migrate" the reflections, as is well known in the art.

The nature and objects of the invention and the manner in which it may be performed will be more clearly understood when reference is made to the following description and the accompanying drawings in which.

Figure 1:
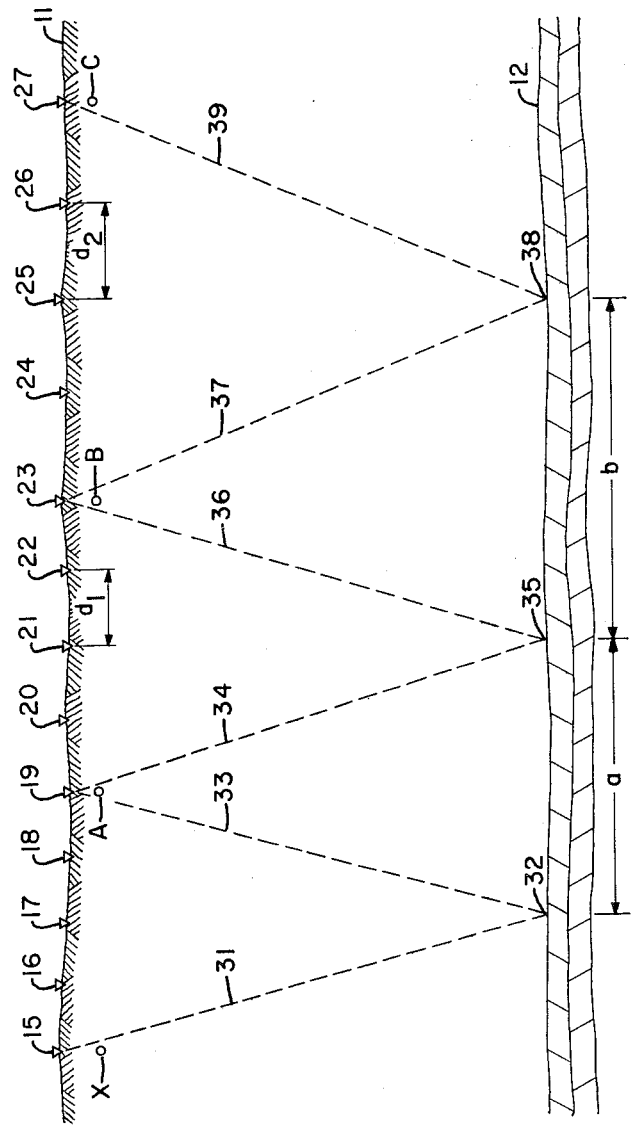
FIGURE 1 is a schematic diagram showing the relative location of shot points and pick up points when running a continuous profile in seismic prospecting.

Referring to FIGURE 1 a continuous seismic profile is ordinarily run by setting off seismic shots at a succession of shot points, X, A, B, C, etc. along a selected course on the earth's surface 11. Usually a split spread is employed, that is the seismometers are arranged symmetrically on each side of the shot point in line with the direction of the survey. The same number of geophones are used in each spread and the distance between geophones is proportional to the distance between adjacent shot points. Thus, for example, the distance $d_1$ between geophones 19 and 20, 20 and 21, 21 and 22, etc. is one-fourth the distance between shot points A and B and the distance $d_2$ between geophones 23 and 24, 24 and 25, etc. is one-fourth the distance between shot points B and C. It is to be understood, of course, that ordinarily there will be more than four geophones on each side of the shot point, this relatively small number being selected merely for the purpose of illustration. It should also be understood that only in an idealized case will the geophones be spaced exactly evenly, for in actual practice the nature of the terrain will often be such as to prevent such as even spacing so that an individual geophone may have to be placed several feet away from the desired spot.

When a shot is fired at point A the reflected pulses from the subsurface layers will be picked up by a spread of geophones comprising geophones 15 to 23, inclusive, omitting the geophone immediately above the shot, i.e. geophone 19, which conventionally is used only for obtaining the "uphole kick" for computing purposes. The waves reaching geophones 15 and 23 will have traveled downwardly along paths represented essentially by lines 33 and 34 to points 32 and 35 and upwardly along paths represented by lines 31 and 35 when considering reflections from subsurface layer 12. Thus the record from shot point A will cover section $a$ of reflecting bed 12. Similarly a shot fired at point B will generate waves that will be detected by the spread of geophones 19 to 27, inclusive, (omitting geophone 23) the outermost patterns of the detected waves reflecting from bed 12 traveling along lines 36 and 37 to points 35 and 38 and upwardly along lines 34 and 39 so that the record from shot point B will cover section $b$ of reflecting bed 12.

Now it is evident, when even spacing of geophones is used in each spread, that if the records from the individual shots are adjusted so that the widths of the traces are proportional to the distances between shot points and the records are placed in side by side abutting relation the resulting composite section will give in proper proportion a representative picture of the several reflections. In the event that the geophone spacing is uneven, some additional adjustment in width of the traces associated with the particular geophones involved will be necessary. Hence it is more accurate to state that the widths of the traces are proportioned to the distances between adjacent reflection points. Point 32 in FIGURE 1 is the reflection point for the trace from geophone 15 and point 35 is the reflection point for the trace from geophone 23 when considering shot point A, assuming 12 to be a horizontal reflection. Reflection points for the traces from geophones 16 to 22 will lie somewhere between points 32 and 35, depending on the spacing of the geophones. Hence it can be stated that the relative spacing of the various reflection points will depend upon the relative spacing of the geophones as well as upon the relative spacing of the shot points. In the simplest case, however, where the geophones are always evenly spaced, the reflection point spacing will be proportional to shot point spacing along a selected straight line profile.

Figure 2:
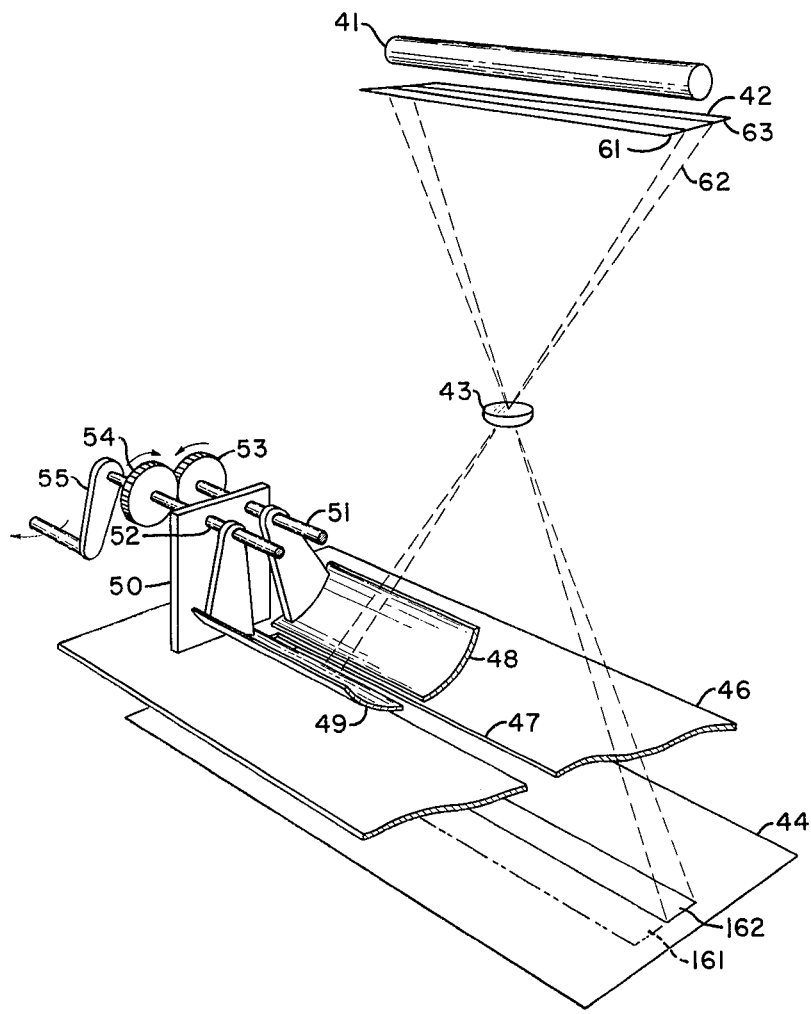
FIGURE 2 is a schematic diagram illustrating one method that may be used in the present invention for assembling variable density seismic records obtained in a seismic profile.

One method that may be used to print the records in side by side relation and to adjust the width of the traces is illustrated schematically in FIGURE 2. The record 42 obtained from a particular seismic shot is projected by means of light source 41 through lens 43 onto a second recording medium 44. An opaque cover 46, having a longitudinal slit 47 of proper size for the final record, is placed over recording medium 44 to permit the printing of the traces individually. Further control of the width of the slit is obtained by means of shutters 48 and 49 fastened to rods 51 and 52 which are rotatably supported by bracket 50. Geared wheels 53 and 54 are mounted on rods 51 and 52 in meshing relationship so that by turning handle 55 a desired gap between shutters 48 and 49 can be obtained. The size of this gap will be determined by the proportional distance between shot points as already mentioned. Then by shifting record 42 and record medium 44 laterally it is possible to project trace 61 as trace 161 on medium 44 and trace 62 as trace 162, etc.

Longitudinal adjustment of record 42 can be made for each trace to incorporate conventional corrections such as weathered layer velocity, elevation with respect to a selected datum and the like.

It is also necessary to make what is known as a spread correction, which makes allowance for the added travel time along each slant ray path from the shot to the reflecting layer and back to each succeeding geophone. While the corrections other than spread correction will be constant for each individual trace throughout its length, the spread correction will change with time because of the difference in travel angle to the deeper beds whose reflections are picked up later on the record. In practicing this invention a selected reflecting bed may be used for applying the spread correction to that depth of the section only or preferably some means of applying a continuous spread correction may be used.

Although, as illustrated, the assembled section is conveniently prepared by projecting each record trace by trace in side-by-side relation onto a single photographic medium 44, it is obviously possible to prepare each corrected record separately and then mount the individual corrected records in side-by-side relation on a suitable support and obtain the same end result. The advantage of this alternative procedure is that in case any mistake is made in projecting one or more traces of one of the records the entire assembly will not be spoiled. However, it will usually be convenient to project all of the records for a section onto a single medium as already described.

Figure 3:
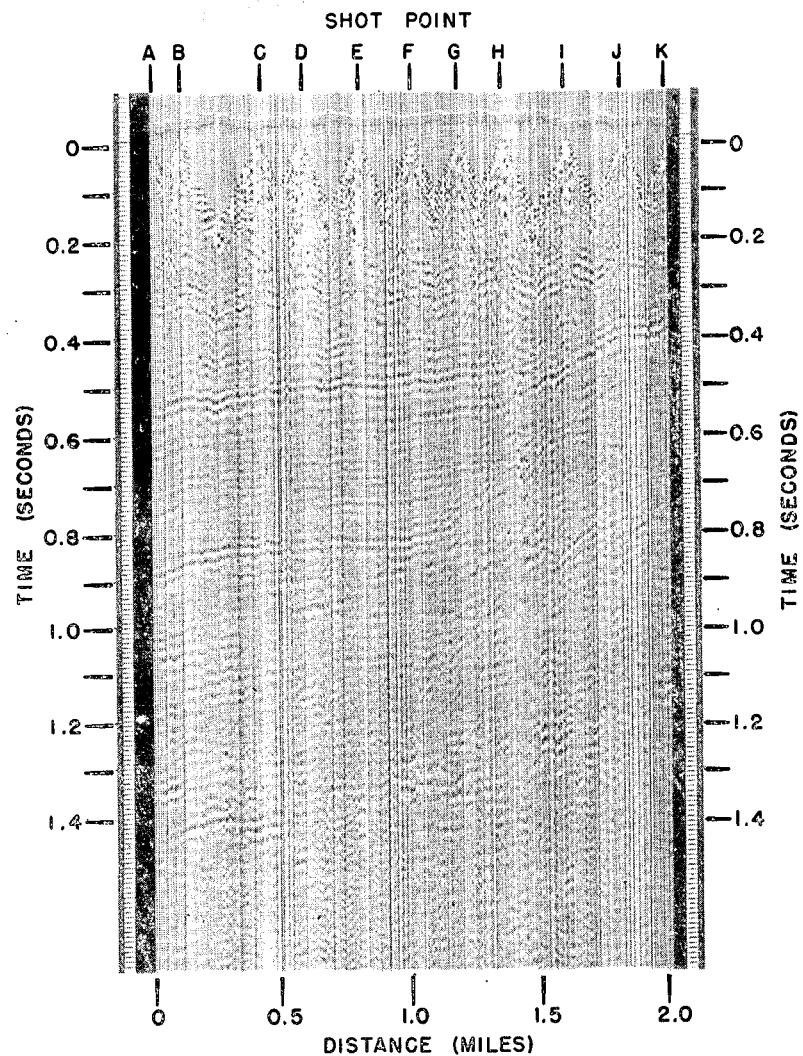
FIGURE 3 is a photographic representation of an assembly of variable density records obtained by practicing this invention.

A photograph of an actual assembled seismic section prepared in accordance with this invention is shown in FIGURE 3. It will be seen that the widths of the individual traces for each record have been adjusted so that they will be proportional to the distance between shot points A, B, C and D, etc. It will be noted that a large number of subsurface reflecting beds are clearly indicated on the photographic record. In making this assembled record the conventional corrections were computed for each trace and a spread correction computed for a reflecting bed at a depth such that the reflection time is 0.8 second. The shot time marks on all of the traces were first placed in alignment and then each trace was shifted longitudinally an amount equivalent to the total computed correction, using the shot time mark as the reference point for this purpose. The shot time mark appears on each trace near the top of FIGURE 3 and shows up on the assembled profile as an uneven horizontal light line above the zero time index on FIGURE 3, the unevenness resulting from the longitudinal shift of each trace as described. The recording of shot time as indicated by opening of the firing circuit upon firing of the detonating cap is conventional practice with which persons skilled in the seismic prospecting art are familiar.

It should also be noted that in preparing the assembled section it is preferred that one of the overlapping traces be omitted from adjacent records. Thus, referring to FIGURE 1 again, the record from shot point A will have a trace associated with geophone 23 that will be an essential duplicate of the trace from geophone 19 on the record obtained from shot point B, for both of these traces will represent wave travel along lines 34 and 36. In preparing the assembled section only one of these traces will normally be used.

Care is also taken in preparing the assembled section to ensure that each trace is of essentially the same length between a given number of timing lines in order that the section will be accurate. Ordinarily no trouble will be encountered in this regard where constant film speed is maintained when making the original records. If through shrinkage a film should become slightly shortened it is a simple matter to stretch it the required amount when making the transfer by projection, in the manner described, so that there will be the same distance between time lines on all traces.

Figure 4:
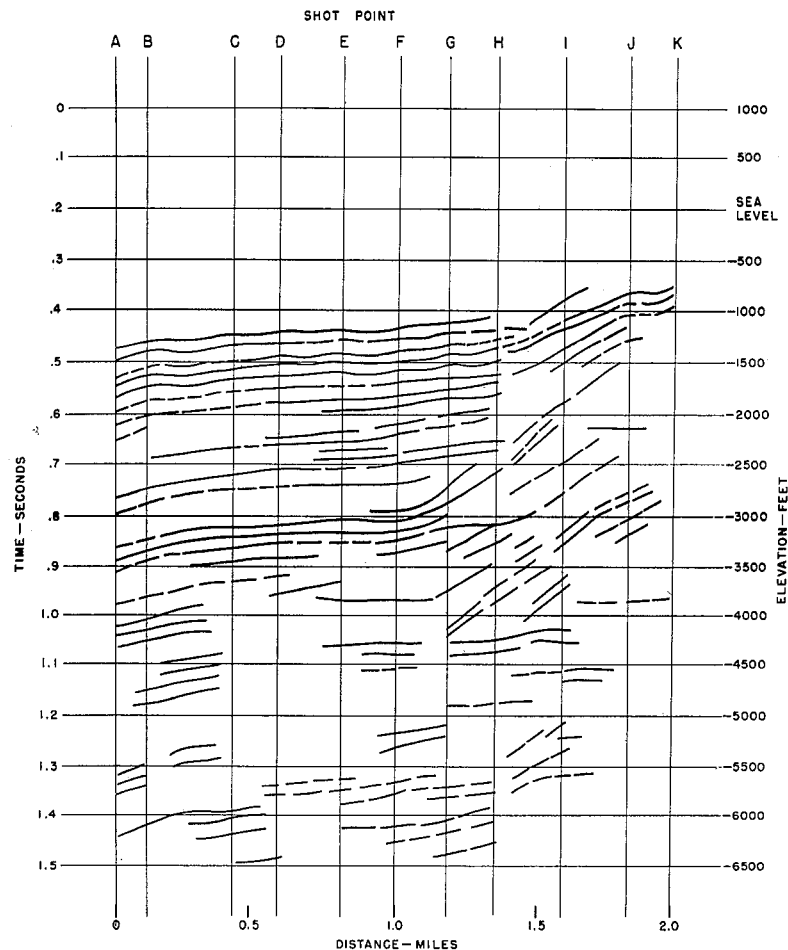
FIGURE 4 is a seismic section traced from the assembled variable density records shown in FIGURE 3.
Figure 5:
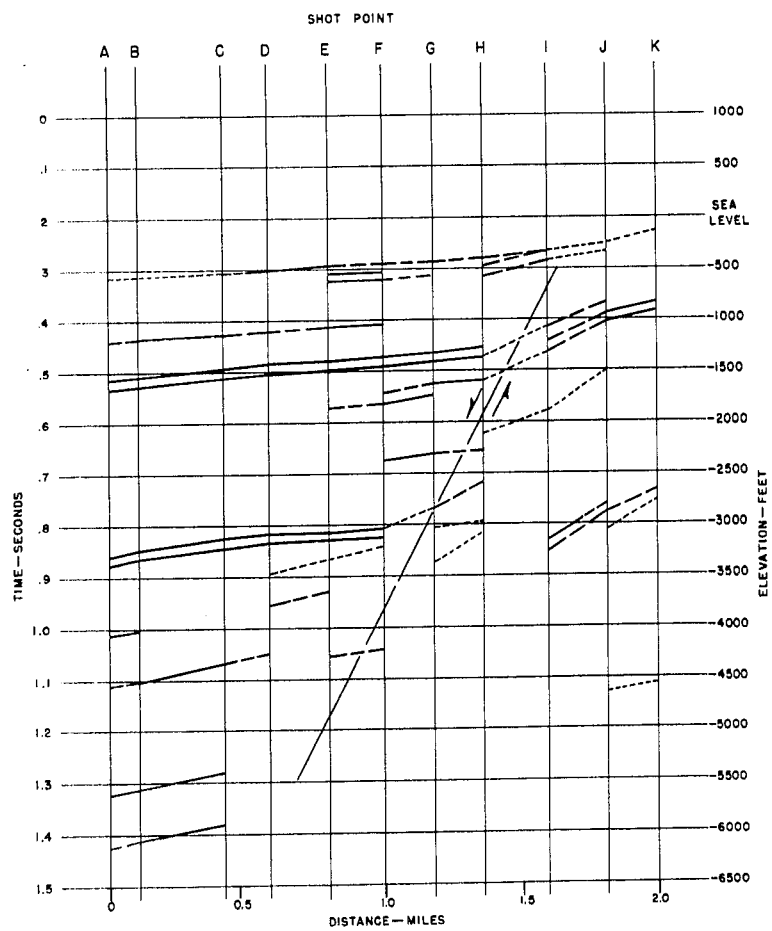
FIGURE 5 represents a seismic section of the same profile as in FIGURE 4 but computed from conventional seismic records.

It is a simple matter to convert the seismic cross-section of FIGURE 3 to more conventional form by tracing the indicated reflections directly from the assembly. The result obtained is shown in FIGURE 4. By comparison a seismic section computed from conventional records run over the same traverse that was used for FIGURE 4 is shown in FIGURE 5. The greater number of reflections obtained by the method of the present invention is readily apparent.

As mentioned above, a continuous spread correction may be made on the record if desired. One means for doing this is shown schematically in FIGURE 6. If in the arrangement shown in FIGURE 2, a plane mirror 66 is placed in the path of light passing through lens 43 to reflect an image on recording medium 44, the original record 42 between points 71 and 73 will be projected as a reproduced record between points 171 and 173 on medium 44. Now if mirror 66 is bent out of its plane into a curve as represented by dashed line 66a it will be seen that the portion of the image adjacent point 61 on record 42 will still reach point 171 on medium 44 along ray path 81, whereas the image portion adjacent point 72 will be displaced from point 172 to point 172a because of the curvature of the mirror and for the same reason the image from the portion of the record adjacent point 73 will be displaced from point 173 to point 173a. Thus there will be a continuous correction which will increase with time along the record from point 71 to point 73, the amount of correction being determined by the curvature of mirror 66. The amount of curvature that must be applied to the mirror to obtain a desired correction can be determined by geometric calculation, or more conveniently by trial and error.

Instead of lining up the individual traces as described and shifting them longitudinally to incorporate the various corrections, an alternative procedure is to line up the traces along a selected prominent reflection as it appears on the assembled section. In many instances this will obviate the need for applying corrections to the individual traces and will give a composite section that will be in the nature of an isopach chart of the subsurface between the selected reflection and an adjacent reflection above it or below it.

Figures 6, 7:
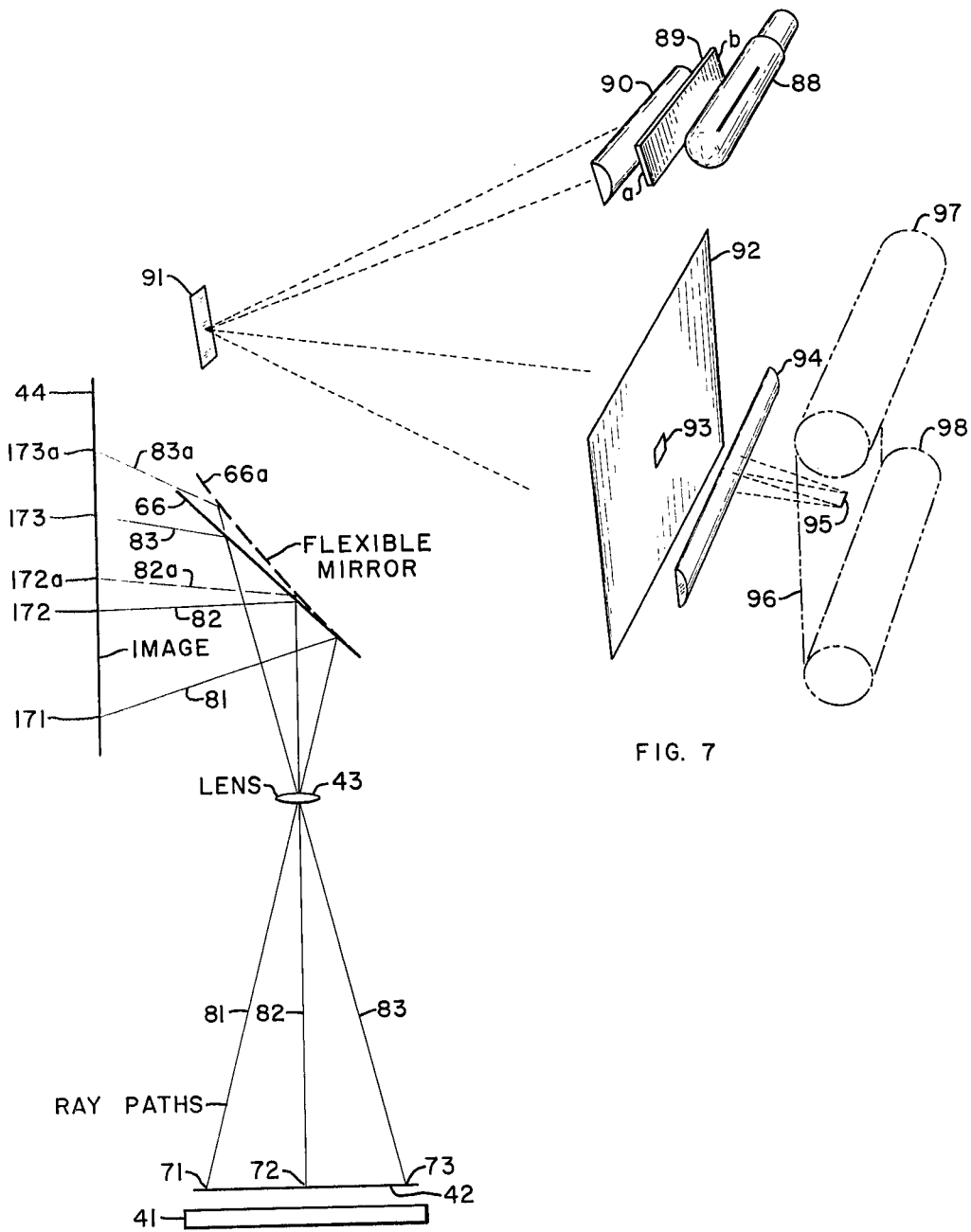
FIGURE 6 depicts schematically one apparatus for performing the method of making a continuous spread correction for each individual trace when projecting it into the assembled record.
FIGURE 7 shows schematically one apparatus for performing the method of making variable color traces suitable for use in practicing the present invention.

Although the invention has been illustrated by examples using variable density recording, it is applicable to any recording method wherein the record trace extends along an essentially straight line and has essentially the same width throughout its length. For example this invention lends itself to the use of records that vary in color with the signal received. One means for making records of this type is shown in FIGURE 7. Light from a line filament lamp 88 passes through a filter 89 having a color spectrum that varies, for example, from violet at point *a* to red at point *b* along its length. The light beam passing through the filter is condensed by means of a cylindrical lens 90. A galvanometer mirror 91 reflects a beam toward a light barrier 92 in the center of which is provided an aperture 93. Galvanometer mirror 91 is of the type used in conventional seismograph recorders and rotates on its vertical axis in response to voltages fed to the galvanometer. A small portion of the image reflected by mirror 91 falls upon the aperture 93 and passes through the barrier, after which it is focused by cylindrical lens 94 into a line image on a color film 96. The latter may be carried by a pair of rollers 97 and 98 which feed the film past the image focus point at a desired speed. Alternatively the film may be mounted on a drum much in the manner disclosed in the aforementioned Rieber patent. The color of the light passing through the aperture will be determined by the relative position of the aperture and the colored image reflected by the galvanometer mirror. Since the reflected image position will be governed by the amount of rotation of the galvanometer mirror and since the rotation of mirror 91 will be proportional to the applied signal, it follows that the color of the light emerging from aperture 93 will depend on the signal fed to the galvanometer.

It is to be understood that the specific description of the invention as presented above is merely by way of example and that many modifications thereof are possible. For instance, where the spacing between reflection points does not vary greatly it will not always be necessary to adjust the widths of the traces and hence in the broadest aspect of the invention this step may be omitted.

The invention claimed is:

1. In a method of preparing a time-corrected seismic section from a plurality of reproducible seismograms derived from a seismic profile extending along the earth using non-uniformly spaced detection points, and wherein the traces of the section and the seismograms are substantially uniform in width throughout their length and are representative of seismic waves picked up at said detection points following reflection of the waves from points in the earth existing between said detection points and their respective seismic disturbance points, the improvement which comprises varying the widths of adjacent traces in said section in proportion to the distances between corresponding adjacent ones of said detection points in said profile.

2. In a method of preparing a time-corrected variable-density seismic section from a plurality of reproducible seismograms obtained from a profile extending along the earth using non-uniformly spaced detection points, and wherein the traces of the section and the seismograms are substantially uniform in width throughout their length and representative of seismic waves reflected from points in the earth and picked up at said detection points, the improvement which comprises varying the widths of adjacent traces in said section in proportion to the distances between corresponding adjacent ones of said detection points in said profile.

3. In a method of seismic prospecting in which a reproducible seismogram is obtained from a plurality of detection points spaced along the earth in a preselected profile pattern from a shot point, the improvement which comprises reproducing the traces of said seismogram, incorporating seismic time corrections within said reproduced traces, and re-recording said reproduced traces in the form of a corrected seismic section, varying each trace in said section in color along its length throughout a spectrum of colors to be representative of the seismic waves reflected from points in the earth and picked up at the detection points corresponding to said traces, and varying the widths of adjacent traces in said section in proportion to the distances between corresponding adjacent ones of said detection points in said profile.

4. In a method of seismic prospecting wherein the seismic waves received at spaced detection points arranged in a preselected profile after reflection from subsurface points lying between said detection points and a shot point are recorded as reproducible traces in a seismogram, each trace being substantially uniform in width throughout its length and representative of the seismic waves picked up at its respective detection point, the improvement which comprises reproducing and incorporating seismic time corrections within each seismogram trace, recording and assembling the corrected traces in the form of a seismic section, varying the color of each section trace throughout a spectrum of colors and along the length of said section trace to be representative of the seismic waves picked up at its respective detection point.

5. A method as defined in claim 4 in which the widths of the section traces are varied in accordance with the distances between corresponding adjacent ones of said detection points in said profile.

6. In a method of seismic prospecting wherein a seismic section composed of time-corrected photographic traces is prepared from a plurality of reproducible seismogram traces derived from a corresponding plurality of non-uniformly spaced detection points arranged in a preselected profile along the earth, and wherein said photographic traces are variable in character along their length to be representative of the seismic waves reflected from points in the earth and picked up at the detection points corresponding to the traces, the improvement which comprises varying the widths of the photographic traces in said section in proportion to the distances between adjacent ones of said detection points in said profile corresponding to said traces.

7. A method as defined in claim 6 in which the photographic traces are made variable in color along their length to be representative of the seismic waves reflected from points in the earth and picked up at the detection points corresponding to the traces.

8. In a method of seismic exploration wherein the arrivals of seismic waves reflected from strata underlying the earth's surface are detected with time by means of geophones located at detection points spaced along the earth's surface in a selected profile pattern, at least some of said detection points being non-uniformly spaced, each such geophone acting to convert seismic waves detected by such geophone into an electrical signal, the improvement which comprises recording the geophone signal from each detection point as a photographic record trace, each such trace being a record with time along its length of geophone electrical signal from a separate one of said detection points, each said trace being substantially uniform in width throughout its length, incorporating corrections within the record traces to convert them to a common datum and for spread, arranging said record traces in side-by-side abutting relation corresponding to the arrangement of their respective detection points in said profile pattern, varying each trace along its length in a phonographic property in accordance with variations in geophone signal from its detection point, varying the widths of successive traces across said assembly in accordance with the corresponding successive spaces between said detection points in said selected profile pattern.

9. A method as defined in claim 8 in which the record traces vary along their lengths in a variable density phonographic property.

10. A method as defined in claim 8 in which the record traces vary along their lengths in a variable color phonographic property, the color of a given point along a given trace being a portion of a spectrum of colors.

References Cited by the Examiner
UNITED STATES PATENTS

| | | | |
|---|---|---|---|
| 2,440,971 | 5/1948 | Palmer | 181—.5 |
| 2,517,659 | 8/1950 | Greenberg | 179—100.3 |
| 2,710,070 | 6/1955 | Merten | 340—15 X |

SAMUEL FEINBERG, *Primary Examiner.*

CHARLES W. ROBINSON, IRVING L. SRAGOW, CHESTER L. JUSTUS, *Examiners.*